United States Patent
Adamczyk et al.

(10) Patent No.: US 7,631,047 B1
(45) Date of Patent: Dec. 8, 2009

(54) SYSTEMS AND METHODS FOR PROVIDING CRITICAL INFORMATION BASED ON PROFILE DATA

(75) Inventors: Maria Adamczyk, Alpharetta, GA (US); Robert A. Koch, Norcross, GA (US)

(73) Assignee: AT&T Intellectual Property I. L.P., Reno, NV (US)

( * ) Notice: Subject to any disclaimer, the term of this patent is extended or adjusted under 35 U.S.C. 154(b) by 399 days.

(21) Appl. No.: 10/179,332

(22) Filed: Jun. 24, 2002

(51) Int. Cl.
*G06F 15/16* (2006.01)
*G06F 15/173* (2006.01)
*G01C 21/00* (2006.01)

(52) U.S. Cl. .................. 709/207; 709/223; 701/213
(58) Field of Classification Search ........... 709/206; 701/214
See application file for complete search history.

(56) References Cited

U.S. PATENT DOCUMENTS

| | | | |
|---|---|---|---|
| 5,513,126 A | 4/1996 | Harkins | |
| 5,635,918 A | 6/1997 | Tett | |
| 5,701,301 A | 12/1997 | Weisser | |
| 5,742,668 A | 4/1998 | Pepe | |
| 5,742,905 A * | 4/1998 | Pepe et al. | 455/461 |
| 5,872,926 A | 2/1999 | Levac | |
| 5,917,449 A * | 6/1999 | Sanderford et al. | 342/457 |
| 5,987,100 A | 11/1999 | Fortman | |
| 6,072,862 A | 6/2000 | Srinivasan | |
| 6,203,192 B1 | 3/2001 | Fortman | |
| 6,237,041 B1 | 5/2001 | Haaaal | |
| 6,249,808 B1 | 6/2001 | Seshadri | |
| 6,335,963 B1 | 1/2002 | Bosco | |
| 6,347,340 B1 | 2/2002 | Coelho | |
| 6,618,763 B1 | 9/2003 | Steinberg | |
| 6,895,017 B2 | 5/2005 | Kitamura | |
| 6,922,725 B2 | 7/2005 | Lamming | |
| 7,003,308 B1 | 2/2006 | Fuoss | |
| 7,181,495 B2 | 2/2007 | Skladman | |
| 7,209,955 B1 | 4/2007 | Major | |
| 7,269,627 B2 | 9/2007 | Knauerhase | |
| 2002/0161862 A1 * | 10/2002 | Horvitz | 709/220 |
| 2003/0023691 A1 | 1/2003 | Knauerhase | |

FOREIGN PATENT DOCUMENTS

WO  WO 0074323 A1 * 12/2000

* cited by examiner

*Primary Examiner*—Peling A Shaw
(74) *Attorney, Agent, or Firm*—Jennifer Pearson Medlin; Morris, Manning & Martin (57) ABSTRACT

Systems and methods for providing critical information to a user of a content providing service based on profile data associated with the user are disclosed. Such systems and methods can include storing a user profile that identifies a plurality of communication pathways via which a critical information alert can be provided to a user associated with the user profile. The critical information alert contains critical information provided by the content providing service. The user profile includes a respective set of decision criteria associated with each of the plurality of communication pathways. A satisfied set of decision criteria is identified from among the respective sets of decision criteria. The critical information alert is provided to the user via the communication pathway associated with the satisfied set of decision criteria.

21 Claims, 6 Drawing Sheets

400

| User Sig; Friendly Name | Decision Criteria | Comm Pathway | Message Type |
|---|---|---|---|
| UserID 1 password 1 "Bill" | M-F; 9:00-5:00 | office_email | text |
| | M-F 8:30-9:00 & 5:00-5:30 | mobile_no | audio |
| | M-F 5:30-11:00 | home_no | audio |
| | Anyday 11:00pm-8:30am | home_email | text |
| | Sat; Sun | pager_no | text |
| UserID 2 | Home | home_no | audio |
| | Work | office_email | text |
| | Travel | pda_addr | text |

410 — User Sig; Friendly Name
420 — Comm Pathway
430 — Message Type
402, 404, 406

| User Sig; Friendly Name | Decision Criteria | Comm Pathway | Message Type |
|---|---|---|---|
| UserID 1 password 1  "Bill" | M-F; 9:00-5:00 | office_email | text |
| | M-F 8:30-9:00 & 5:00-5:30 | mobile_no | audio |
| | M-F 5:30-11:00 | home_no | audio |
| | Anyday 11:00pm-8:30am | home_email | text |
| | Sat; Sun | pager_no | text |
| UserID 2 | Home | home_no | audio |
| | Work | office_email | text |
| | Travel | pda_addr | text |

FIG. 5B

SYSTEMS AND METHODS FOR PROVIDING CRITICAL INFORMATION BASED ON PROFILE DATA

FIELD OF THE INVENTION

This invention relates to the field of communication systems. More particularly, the invention relates to systems and methods for providing critical information to a user of a content providing service based on profile data associated with the user.

BACKGROUND OF THE INVENTION

The proliferation of content servers on the World Wide Web has resulted in the availability of a seemingly infinite supply of information. With the click of a mouse button, a user can access just about any type of information—stocks, news, weather, traffic, and so forth—by accessing a content server that provides that type of information.

Some content providers enable a user to setup an account to access certain information that is of interest to the user. For example, a content server might enable a user to setup a stock portfolio where, for each of the stocks, the content server provides certain information, such as current stock price and news relating to the company.

Some of the information that the content server provides is merely informative. For example, such a content server might provide the user with information about the current price of a particular stock, the current weather in a particular area of interest to the user, the traffic situation within an area of interest to the user, or news about a particular company.

There are circumstances, however, when a piece of information is considered "critical" to the user. For example, the user might want to know immediately if a particular stock hits a particular price, or if there is a traffic jam on the route home. Typically, the user can request that, in such circumstances, the content server notify the user by providing a "critical information alert." The content server can provide such an alert, for example, if a certain stock hits a certain price, if a storm is coming, if there is a traffic jam, or if a company announces something significant.

Such critical information alerts are typically provided via a fixed communication pathway between the content server and a device via which the user can receive the critical information alert. Typically, the user provides the server with communications pathway data that identifies one or more communication pathways via which the user wishes to be notified of any critical information. For example, the user might provide a pager number to which the content server can initiate a call and send a text message (that informs the user that a certain stock has hit a certain price, for example). Other examples of such communication pathways include telephone, email, and the like.

The content server typically stores such communication pathway data in a data store and associates respective communication pathway data with each such user. Typically, however, the communication pathway data is fixed—that is, the content server stores a fixed set of one or more pathways via which each user should be notified of any critical information. The content server then notifies the user via those specified pathways whenever a critical alert is transmitted—regardless of the type of information or the time at which the notification is being transmitted. Thus, such a system can provide a user with immediate access to critical information—as long as the user has access to the specified communication pathway. If, however, the user is not currently using the specified device, the user would not receive the critical information alert, and might not receive the critical information until it is too late to benefit from it.

It would be advantageous, therefore, to users of such content providing services, if systems and methods were available that identify a currently preferred communication pathway by which to provide such critical information. Such systems and methods could be based on a user profile associated with the user, and would be particularly advantageous if they were to provide such critical information based on the presence, availability, location, and preferences of the user.

BRIEF SUMMARY OF THE INVENTION

The invention provides systems and methods for providing critical information to a user of a content providing service based on profile data associated with the user. Such systems and methods can include storing a user profile that identifies a plurality of communication pathways via which a critical information alert can be provided to a user associated with the user profile. The critical information alert contains critical information provided by the content providing service. A user interface could be provided via which the user can provide data relating to the user profile.

The user profile can identify, for a selected communication pathway, an alert receiving device associated with the selected communication pathway, and a device identifier that enables an alert server to provide the critical information alert via the selected communication pathway. The device identifier could include a number, such as a telephone number, a pager number, or a fax number, that enables the alert server to establish a telephone connection to the alert receiving device. The device identifier could include a network address, such as an email address, that enables the alert server to establish a telephone connection to the alert receiving device.

The user profile includes a respective set of decision criteria associated with each of the plurality of communication pathways. The decision criteria can be based, for example, on a current status or location of the user, the time of day, the day of the week. The decision criteria could also be based on presence information associated with the user.

A satisfied set of decision criteria is identified from among the respective sets of decision criteria. The critical information alert is provided to the user via the communication pathway associated with the satisfied set of decision criteria. The critical information alert could be provided to an alert receiving device associated with the communication pathway associated with the satisfied set of decision criteria.

A method according to the invention can include receiving from a content providing service, critical information that is associated with a user of the content providing service. A preferred communication pathway via which to provide a critical information alert to an alert receiving device associated with the user of the content providing service is identified. A critical information alert that contains the critical information can then be provided to the alert receiving device via the preferred communication pathway.

An alert server according to the invention can include: a data store that contains a user profile associated with a user of a content provider service; identification means for identifying, based on the user profile, a preferred communication pathway for transmitting a critical information alert; and transmission means for transmitting the critical information alert via the preferred communication pathway.

BRIEF DESCRIPTION OF THE SEVERAL VIEWS OF THE DRAWING

Other features of the invention are further apparent from the following detailed description of the embodiments of the present invention taken in conjunction with the accompanying drawing, of which.

DETAILED DESCRIPTION OF THE INVENTION

Figure 1:
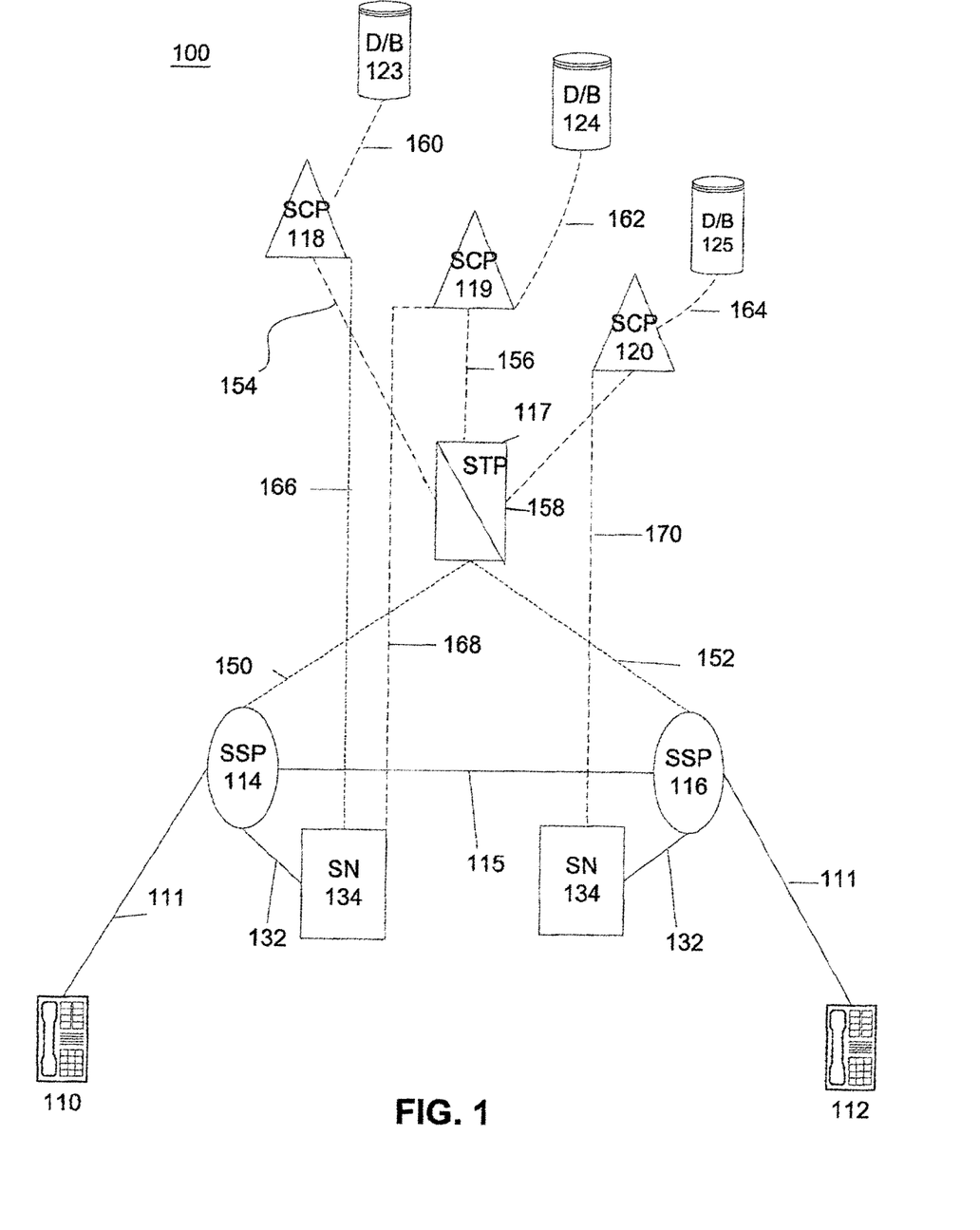
FIG. 1 is a block diagram of an exemplary telecommunication network in which the principles of the invention can be employed.

FIG. 1 is a block diagram of an exemplary telecommunication network 100, such as a public switched telecommunications network (PSTN), in which the principles of the invention can be employed. More particularly, FIG. 1 illustrates a simplified advanced intelligent network (AIN). AIN systems are described in U.S. Pat. No. 5,701,301, the disclosure of which is hereby incorporated herein by reference. Though the various features and aspects of the invention can be utilized in conjunction with an AIN, it should be understood that the invention is not limited to AIN-based systems, and that other networks and system arrangements can be used in accordance with the invention.

As shown, the AIN 100 can include a plurality of service switching points (SSPs) 114, 116. SSPs 114, 116 are capable of generating AIN queries. An SSP, which is also known as a "central office," is basically a switch and the terms are used interchangeably herein. SSPs 114 and 116 can comprise, for example, DMS100 or 5ESS switches. These switches can be manufactured by, for example, Lucent Technologies, Inc. or Nortel Networks.

Each of the SSPs 114, 116 can have one or more subscriber lines 111 connected thereto. Subscriber lines 111 may also be referred to as calling lines. Each SSP 114, 116 serves a designated group of calling lines 111, and thus, the SSP that serves a particular calling line may be referred to as its serving switch. Typically, each calling line 111 is connected to one or more pieces of terminating equipment 110, 112, such as a telephones, facsimile machines, computers, modems, or other such telecommunication devices.

SSPs 114, 116 are interconnected by one or more trunk circuits 115. Trunks 115 are basically the voice paths via which communications are connected between SSPs. The term "communication" or "call" is used herein to include all messages that may be exchanged between the calling party and the called party in a telecommunication network, such as illustrated in FIG. 1. Trunk 115 can be either a Signaling System 7 (SS7) controlled multi-frequency (MF) trunk, or primary rate interface (PRI) trunk or the like. The type of trunk will be in accordance with both the sending and receiving SSP to which it is connected.

Each SSP 114, 116 can include different types of facilities and/or triggers. SSPs 114 and 116 are programmable switches that can perform some or all of the following functions: recognize AIN-type calls, launch queries, and receive commands and data to further process and route AIN-type calls. When one of SSPs 114 or 116 is triggered by an AIN-type call, the triggered SSP 114 or 116 formulates and sends an AIN query. Based on the reply from the AIN network, SSP 114 or 116 responds to call processing instructions received.

Each of SSPs 114 and 116 is connected to a signal transfer point (STP) 117 via respective data links 150, 152. Data links 150, 152 can employ SS7, for example, though it should be understood that any suitable signaling protocol could be employed. To facilitate signaling and data messaging, each SSP 114 and 116 can be equipped with Common Channel Signaling (CCS) capabilities, e.g., SS7, which provides two-way communications of data messages over CCS links 150 and 152 between components of the AIN network. The data messages can be formatted in accordance with the Transaction Capabilities Applications Part (TCAP). Alternatively, Integrated Service Digital Network (ISDN) Users Part (ISUP) can be used for signaling purposes between, for example, SSPs 114 and 116. In such a case, SSPs 114 and 116 can be equipped with the capability to map appropriate data between TCAP and ISUP protocols, and vice versa. The telephone network basically employs an upper-level software controlled network through the STPs and the SCP.

SSPs 114 and 116 may allow normal switch processing to be suspended at specific points in a call so that the switch can send an AIN message query via signaling transfer point (STP) 117 to SCP 118, 119 or 120. SCP 118, 119 or 120 may execute software based service logic and return call-processing instructions to the triggering AIN SSP. New services may be provisioned by assigning AIN SSP triggers to customer lines, trunks, and/or NANP (North American Numbering Plan) telephone numbers.

Much of the intelligence of the AIN resides in a type of AIN element referred to as a service control point (SCP) 118, 119, 120 that is connected to STP 117 over an SS7 data link, or the like, 154, 156 or 158. Accordingly, the connections by links 150, 152, 154, 156, and 158 are for signaling purposes and allow SSPs 114 and 116 to send messages to, and receive messages from, SCP 118, 119 and 120.

Among the functions performed by SCP 118, 119, 120 is the hosting of network databases and subscriber databases, which may be stored in respective data storage objects 123, 124, 125. For example, data storage object 123 is shown as a database communicatively coupled via respective communication paths 160, 162, 164 to SCP 118, although data storage object 123 can be embodied as a component within SCP 118, such as an internally-mounted hard disk device. The databases stored in data storage object 123 may be used in providing telecommunications services to a customer. Typically, SCP 118, 119, 120 is also the repository of service package applications (SPAs) that are used in the application of telecommunication services, enhanced features, or subscriber services to calling lines. Additionally, SPAs may use databases for providing telecommunication services.

A set of triggers can be defined at the SSPs 114, 116. A trigger in the AIN is an event associated with a particular call that initiates a query to be sent to SCP 118, 119, or 120. The trigger causes selected SCP 118, 119, or 120 to access, if necessary, its respective database 123, 124, or 125 for processing instructions with respect to the particular call. The results of the SCP processing and/or database inquiry is/are sent back to selected SSP 114 or 116 in a response through STP 117. The return packet includes instructions to SSP 114, 116 as to how to process the call. The instructions may be to take some special action as a result of a customized calling service, enhanced feature, or subscriber service. In response, switch 114, 116 moves through its call states, collects the called digits, and generates further packets that are used to set up and route calls. Similar devices for routing calls among various local exchange carriers are provided by regional STP and regional SCP.

An example of such a trigger is a termination attempt trigger (TAT), which causes a query to be sent to SCP 118, 119, or 120 whenever an attempt is made to terminate a call on the line of subscriber 110 or 112. Another type of trigger that may be used is a Public Office Dialing Plan (PODP) trigger, though it should be understood that the principles of the invention include the use of other triggers.

The AIN can also include a services circuit node 134 (SCN), which may also be referred to herein as a services node (SN). SN 134 is an interactive data system that acts as a switch to transfer calls. SN 134 may provide interactive help, collect voice information from participants in a call, and/or provide notification functions. SN 134 can be a Lucent Technologies Star Server FT Model 3200 or Model 3300 although other such devices can be employed. SN 134 can include voice and dual tone multi-frequency (DTMF) signal recognition devices and/or voice synthesis devices. In addition, SN 134 can include a data assembly interface. SN 134 can be connected to local SCP 118, 119, 120 via respective data links 166, 168, 170 using an X.25, SS7 or TCP/IP protocol or any other suitable protocol. In addition, SN 134 typically may be connected to one or more (but usually only a few) SSPs via Integrated Service Digital Network (ISDN) lines or any other kind of suitable telephone lines 132.

One skilled in the art will further recognize that the above-described network is a simplified network meant for explanatory purposes. It is likely that a telephone network might include numerous user stations, SSPs, STPs, SCPs, and SNs along with other telephone network elements, and can employ other types of triggers without departing from the spirit and scope of the invention.

Figure 2:
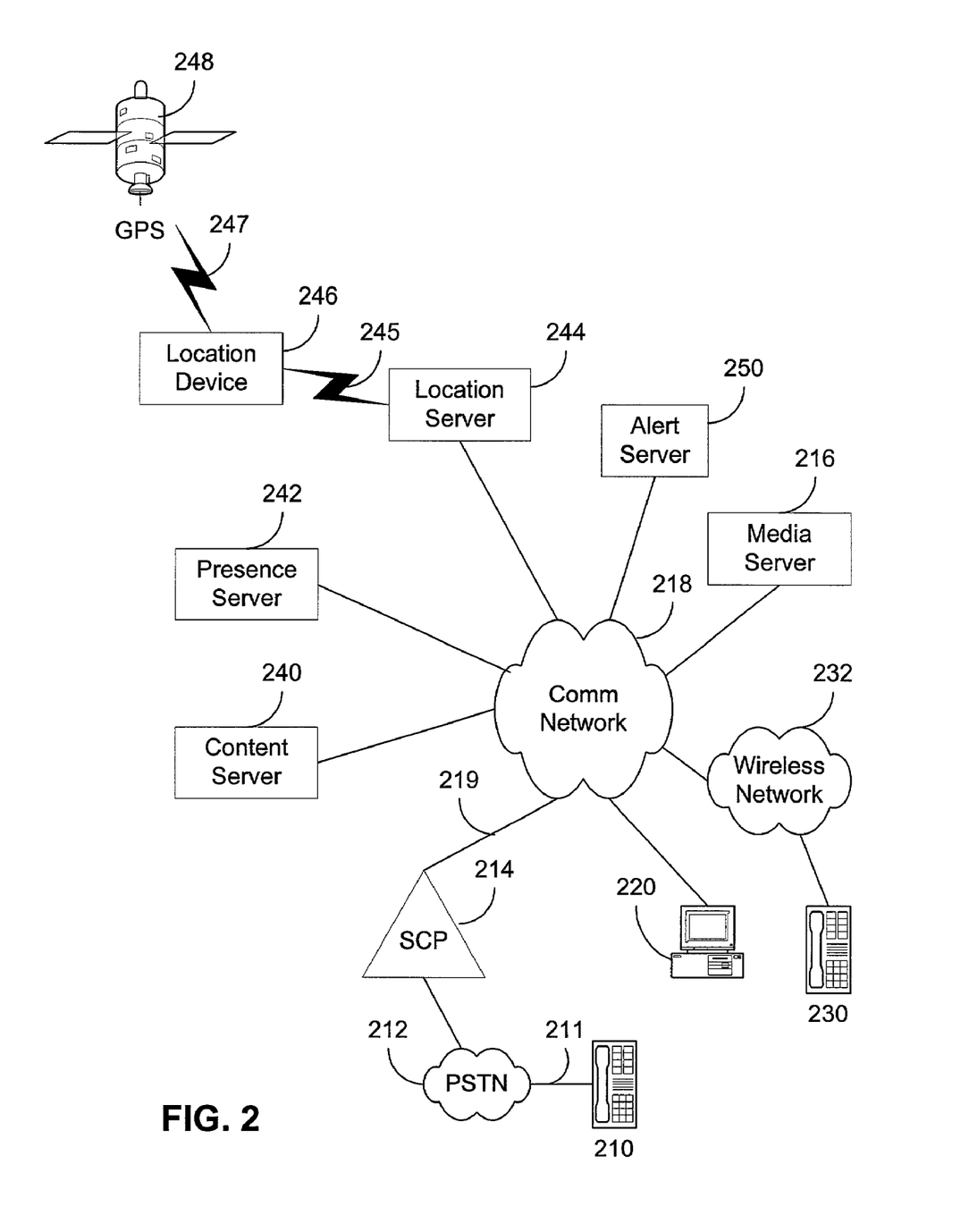
FIG. 2 is a functional block diagram of a preferred embodiment of a system according to the invention.

FIG. 2 is a functional block diagram of a preferred embodiment of a system according to the invention that includes a content server 240, a presence server 242, a location server 244, and an alert server 250, each of which is communicatively coupled to a communication network 218. Preferably, the communication network 218 is the Internet, though its should be understood that the communication network 218 could be any local or wide area network, such as a proprietary intranet, for example. Additionally, it should be understood that the functions of servers 240, 242, 244, and 250 could be implemented on separate computers or on a single computer. Also, the functions of any of servers 240, 242, 244, and 250 could be implemented on a single computer or on multiple computers.

According to the invention, a user can use a telephone 210 to call into the alerting service, which can be provided as an option in an existing telephone service or as a standalone service. The user's telephone 210 is connected to a PSTN 212 via a calling line 211. The PSTN 212 directs the call through an SCP 214, which can be coupled to the network 218 via a communication link 219. Thus, in a preferred embodiment of the invention, the SCP 214 can perform the main processing (described below) for the alerting service. That is, the functions of the alert server 250 can be integrated into the SCP 214. Alternatively, the functions of the alert server could be implemented separately from the SCP 214. Thus, the present invention can be embodied in an AIN-based telephone system such as described above. The SCP 214, for example, can include a computer-readable medium having computer-executable instructions thereon for performing a method according to the invention. The present invention, however, can be implemented in other components of an AIN-based telephone network, or in any other telephone network or system. Consequently, the present invention should not be construed to be limited to AIN-based systems.

Alternatively, the user can connect to the alerting service via the communications network 218, which is preferably the Internet. The user, via a browser executing on the user's client device 220, can access web sites provided by any of the servers 240, 242, 244, and 250. The client device 220 can be a desktop computer, laptop computer, or any other such device that can be communicatively coupled to the communication network 218. The client device 220 can be communicatively coupled to the communication network 218 via wired or wireless telephone lines, cable, or any other such communications link.

The user can also access the alerting service via a wireless device 230, such as a mobile telephone or personal digital assistant, for example. The wireless device is communicatively coupled to a wireless network 232, which is communicatively coupled to the communication network 218. Thus, a user can access the alerting service via a wireline or wireless connection. Alternatively, the user can also access the alerting service via a voice portal via VoiceXML or other such language.

In accordance with the invention, the user can request that the content server 240 deliver critical information to the alert server 250. It should be understood that a single content server 250 is depicted in FIG. 2 for simplicity, though any number of content servers can be coupled to the alert server 250 via the communication network 218. Typically, a content server enables a user thereof to identify certain information that the content server provides as being critical information. For example, a content server that provides stock quotes and news related to publicly owned companies might enable a user to request notification if a certain specified stock hits a certain specified price, or if a certain publicly owned company issues a news release, or the like. The user can request, for example, that the content server notify the user via a specified communication pathway if the specified stock hits the specified price. Such content servers typically provide only one communication pathway for such notification (such as via the user's email account or pager, for example).

In accordance with the invention, however, the user can request that the content server 240 notify the alert server 250 of any critical information. That is, the user can specify the alert server 250 as the communication pathway by which the content server 240 should notify the user of any critical information. The user can cause the critical information alerts to be routed to the alert server 250 by providing a pathway that enables the content server 240 to deliver the critical information to the alert server 250. Preferably, the pathway also enables the alert server 250 to determine which user is to receive the critical information alert. For example, the pathway can include a network address, such as "userID1 @ alertserver." Such an address enables the content server to deliver the message to "alertserver," and also enables "alertserver" to determine that the received critical information is to be delivered to the user having user ID "userID1."

As shown in FIG. 2, a presence server 242 can be coupled to the communication network 218 to provide presence information to the alert server 250. Presence servers, as are well known in the art, typically maintain information as to whether or not a user is "present" at any of one or more communication devices associated with the user. This information may be obtained either via communication between the presence server and the one or more communication devices, or via communication between the server and other network elements to which the one or more communication devices are coupled.

The presence information that the presence server 242 maintains can include device login status and capabilities. For example, the presence server 242 can maintain information that indicates whether the user is logged onto the Internet at a specific computer, whether the user's pager is on and in range, whether the user's mobile phone is on and in range, whether the user's instant messaging client is active, or the like. Such presence information can also include user availability information, such as user preferences that indicate how the user would like to receive communications in certain circumstances. For example, the user can define "active personas" that are associated with certain devices and means of communication.

As is also shown in FIG. 2, a location server 244 can be coupled to the communication network 218 to provide location data to the alert server 250. Preferably, the location server 244 maintains a data store that contains respective location data associated with each of a plurality of users of the alerting service. The location data represents the current geographic location of the associated user. The alert server 250 can poll the location server 244 to retrieve the location data associated with a specific user.

In a preferred embodiment of the invention, a user of the alerting service can wear or carry a location device 246 that transmits to the location server 244 location signals 245 that represent the current geographic location of the user. Preferably, the location device 246 includes a GPS receiver that receives GPS signals 247 from a plurality of GPS satellites 248. The GPS receiver determines the current geographic location of the user from the GPS signals. Preferably, the current location of the user is expressed in terms of longitude and latitude. The location device can also include a transmitter that transmits the location signals to the location server 244. The location signals 245 can include data that represent the current geographic location of the user (such as the longitude and latitude, for example), as well as an identifier that uniquely identifies the user's location device 246.

Alternatively, the location device 246 can be a simplex device that transmits a signal train (i.e., a series of pulses) to the location server 244, which can compute the current location of the associated user from the received signal train. In any event, the location server 244 determines the current location of the user, preferably in terms of longitude and latitude. The location server 244 can be an integral component of the alert server 250, which may or may not be on the SCP 214, or it can be part of an outside service that provides the location data to the alert server 250.

The alert server 250 can then determine the preferred communication pathway to deliver to the user a critical information alert that contains the critical information. The alert server can determine the preferred communication pathway based on user preferences in the user profile and any location data or presence information, such as the user's active persona, for example, that the alert server has at the time it receives the critical information from the content server.

In a preferred embodiment, the alert server 250 can simply poll the presence server 242 to determine where the user can be reached at the time the critical information is received. Preferably, the alert server 250 queries the presence server 242, via APIs that are provided for this purpose, to determine user availability. The presence server 242 could also query the location server 244 to determine the current location of the user, which provides the presence sever 242 with additional information to determine how best to reach the user.

A media server 216, as is well known in the art, can be coupled to the network 218 or PSTN 212 to enable the notification service to initiate telephone calls, dispatch electronic mail, or otherwise establish communications with the user. The alert server 250 can initiate a telephone call, for example, by sending a call request to the media server 216. The media server 216 places the call and plays an audio message informing the user of the critical information. The media server can be an integral component of the notification service on the SCP 214, or it can be part of an outside service that performs these functions for the notification service. The wireless network 232 enables the alert server 250 to notify the user via a wireless device 230, such as a mobile telephone, pager, PDA, or the like.

Figure 3:
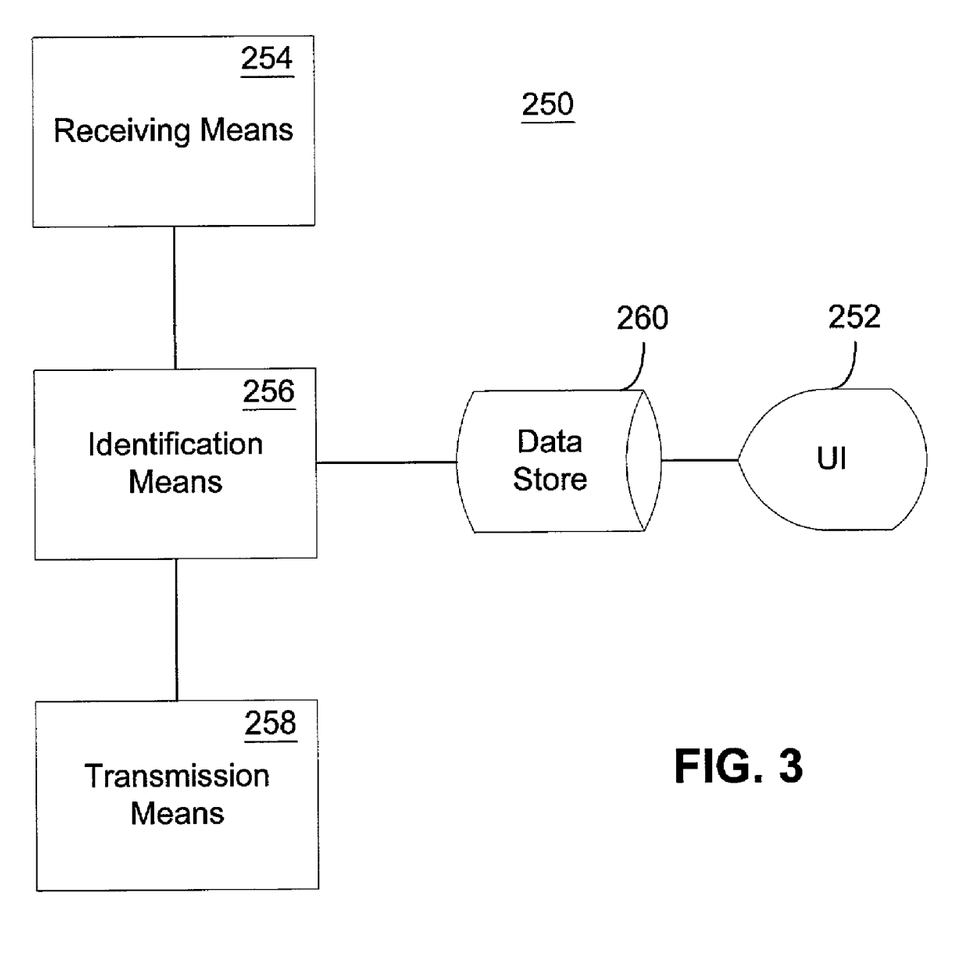
FIG. 3 is a block diagram of a preferred embodiment of a critical information alert server according to the invention.

FIG. 3 is a block diagram of a preferred embodiment of a critical information alert server 250 according to the invention. As shown in FIG. 3, the alert server 250 can include a data store 260 in which user profile data corresponding to each of a plurality of users can be stored. Such profile data is described in detail below in connection with FIG. 4. Generally, the user profile identifies a plurality of communication pathways via which a critical information alert can be provided to the associated user. Preferably, the alert server 250 also includes a user interface 252 via which a user can provide data to be stored in the data store 260. The user interface 252 can be telephone based or network based, as described above.

In a preferred embodiment of the invention, the alert server 250 includes receiving means 254, identification means 256, and transmission means 258. The receiving means 254 receives critical information from the content server 240, and can also receive location data from the location server 244 and presence information from the presence server 242. The identification means 256 is for identifying, based on the user profile and any available presence information or location data, a preferred communication pathway for transmitting a critical information alert to the user. The transmission means 258 is for transmitting the critical information alert via the preferred communication pathway.

Figure 4:
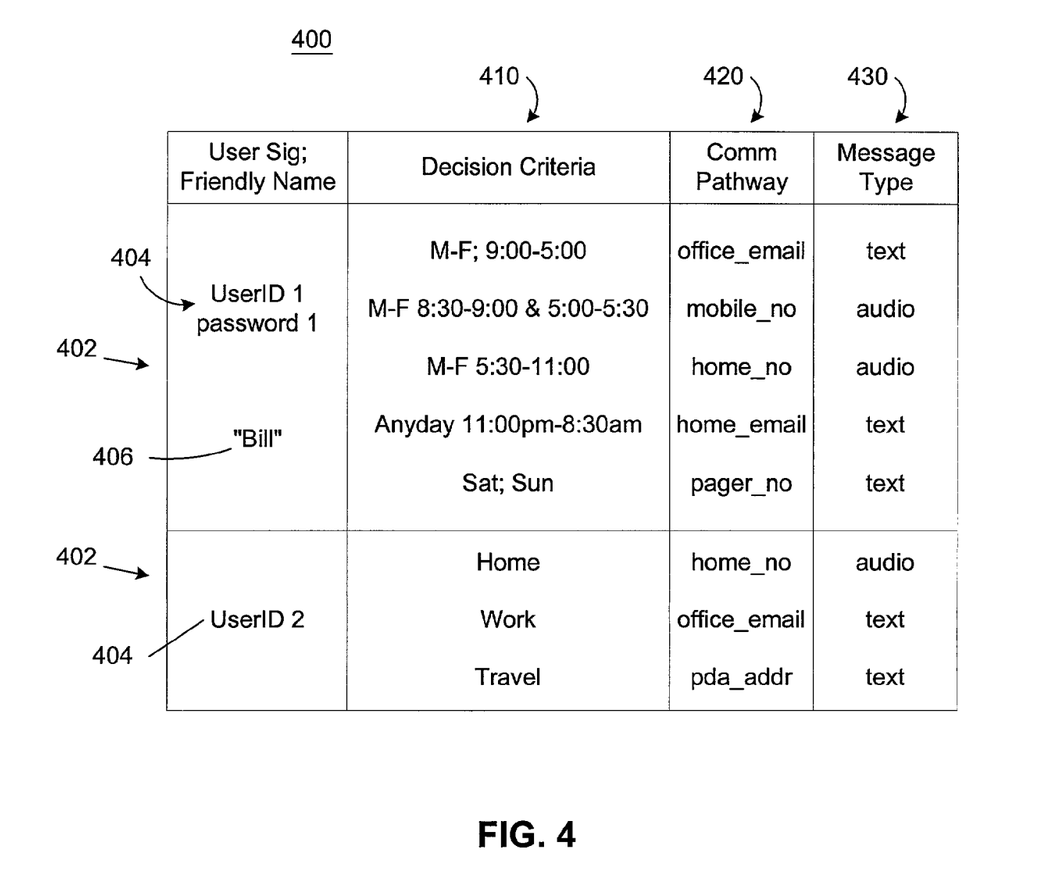
FIG. 4 depicts a preferred embodiment of a customer profile for use in accordance with the invention.

FIG. 4 depicts a preferred embodiment of a user profile table 400 for use in accordance with the invention. As shown in FIG. 4, the profile table 400 can include a respective entry or user profile 402 for each of a plurality of users. Each user profile 402 can contain a respective user signature 404. A user signature 404 can include a user ID and optional password, for example. Each user profile 402 can also include an optional friendly name 406 that is associated with the user.

According to the invention, each user profile 402 can also include one or more sets of decision criteria 410, via which the alerting service can determine how to notify the user of any critical information. The decision criteria 410 can be "objective" criteria, such as criteria based on time of day, day of the week, or the like, or "subjective" criteria, such as criteria based on the current "status" of the user (e.g., the user is most likely at work, at home, on vacation, etc.). Each set of decision criteria 410 is associated one or more communication pathways 420. In the event that the alert server receives critical information for the user, the server can identify from the decision criteria 410 the communication pathway via which the user would prefer to receive the critical information alert. The user profile 402 can also include a message type 430 that indicates the type of message, such as text or audio, for example, that is to be delivered via the associated communication pathway 420.

A first exemplary user profile, as shown in FIG. 4, can be associated with a user, whose friendly name is "Bill." Bill has a user signature that includes a user ID "UserID 1" and a password "password 1." Bill is a structured guy. Every day from Monday through Friday, Bill works in his office from 9:00 am until 5:00 pm. At those times, Bill wants to be notified via a text message to his office email account. From 8:30 am and 9:00 am, and then again from 5:00 pm until 5:30 pm, Bill is driving. At those times, Bill wants to be notified via an audio message to his mobile phone. From 5:30 pm until 11:00 pm, Bill is at home and wants to be notified via his home phone. Between 11:00 pm and 8:30 am, Bill does not want to be disturbed, and prefers to be notified via his home email account, which he checks every morning before he leaves for work. On weekends, Bill prefers to be notified by pager, because he does not know where he is going to be.

Note that "Anyday 11:00 pm-5:30 am" can conflict with "Sat; Sun." That is, if critical information arrives at 11:30 pm on a Saturday night, the alert server can send the corresponding critical information alert to both Bill's home email account and to his pager. Alternatively, the alert server can resolve the conflict and send the critical information alert to either his home email account or his pager. To resolve such a conflict, priorities can be assigned to the sets of decision criteria. For example, the server can invite Bill to choose whether day of the week (e.g., Sat; Sun) should trump time of day, or vice versa.

Additionally, if the current day is M-F, but the server has received presence information or location data that suggests that Bill is working at home, Bill might prefer to receive critical information via an audio message to his home telephone. Similarly, if the presence information or location data suggests that he is traveling or away on business, he might prefer to be notified via a text message to his PDA.

A second exemplary user profile shown in FIG. 4 is for a user who is much less structured than Bill, even if somewhat less cautious and more anonymous. The second user, who has a user ID of "UserID 2," but no friendly name or password, has simply set up decision criteria that indicate that the server should attempt to determine whether he is more likely at home, at work, or traveling, and then send critical information alerts accordingly. As shown, User 2 would prefer to have an audio message sent to his home telephone number if he is at home. If he is at work, he would prefer to have a text message sent to his office email account. If he is traveling, he would prefer to have a text message sent to his PDA.

To determine whether the user is at home, or work, or traveling, the server can evaluate any available location data to determine where the user is geographically. The location data can be matched against location data that specifies the location of the user's home and office. If he is not in his office or in his home, then the system concludes that he must be traveling. Additionally, if he is located at home, but available presence information indicates that he is logged on to a network via his laptop computer, then he is most likely working from home, and the service can provide critical information alerts via his office email account.

It should be understood that the decision criteria discussed herein are merely exemplary, and that any data and any algorithm can be used to identify a preferred communication pathway via which to provide a critical information alert without departing from the principles of the invention.

Figure 5A:
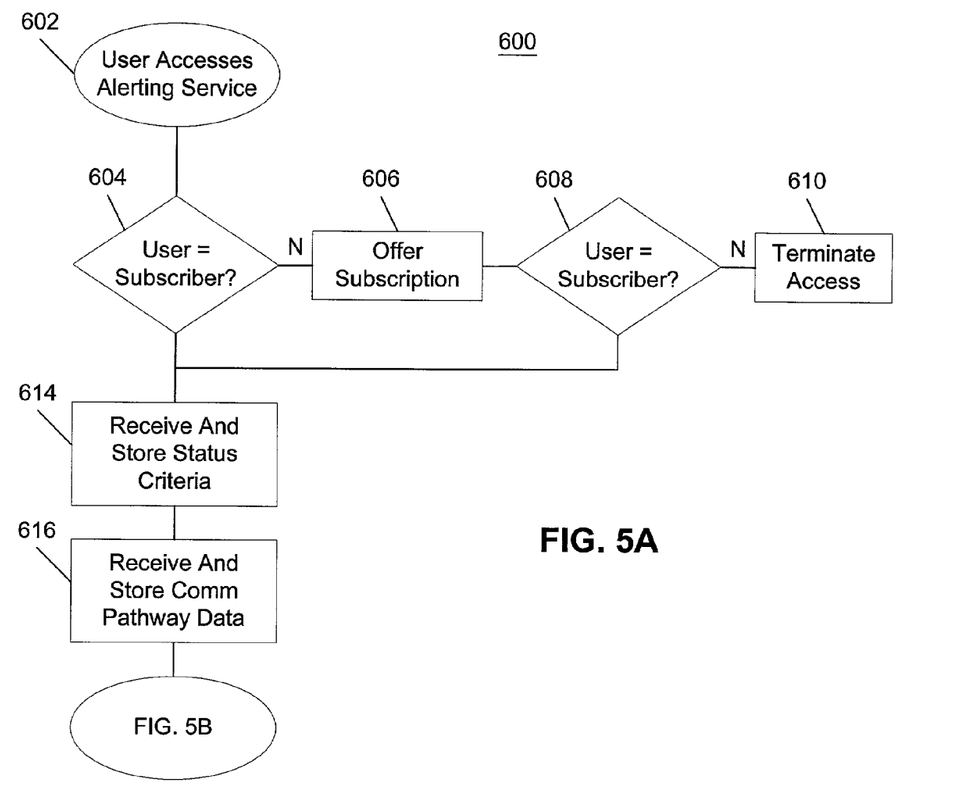
FIGS. 5A and 5B provide a flowchart of a preferred embodiment of a method according to the invention for providing critical information alerts.
Figure 5B:
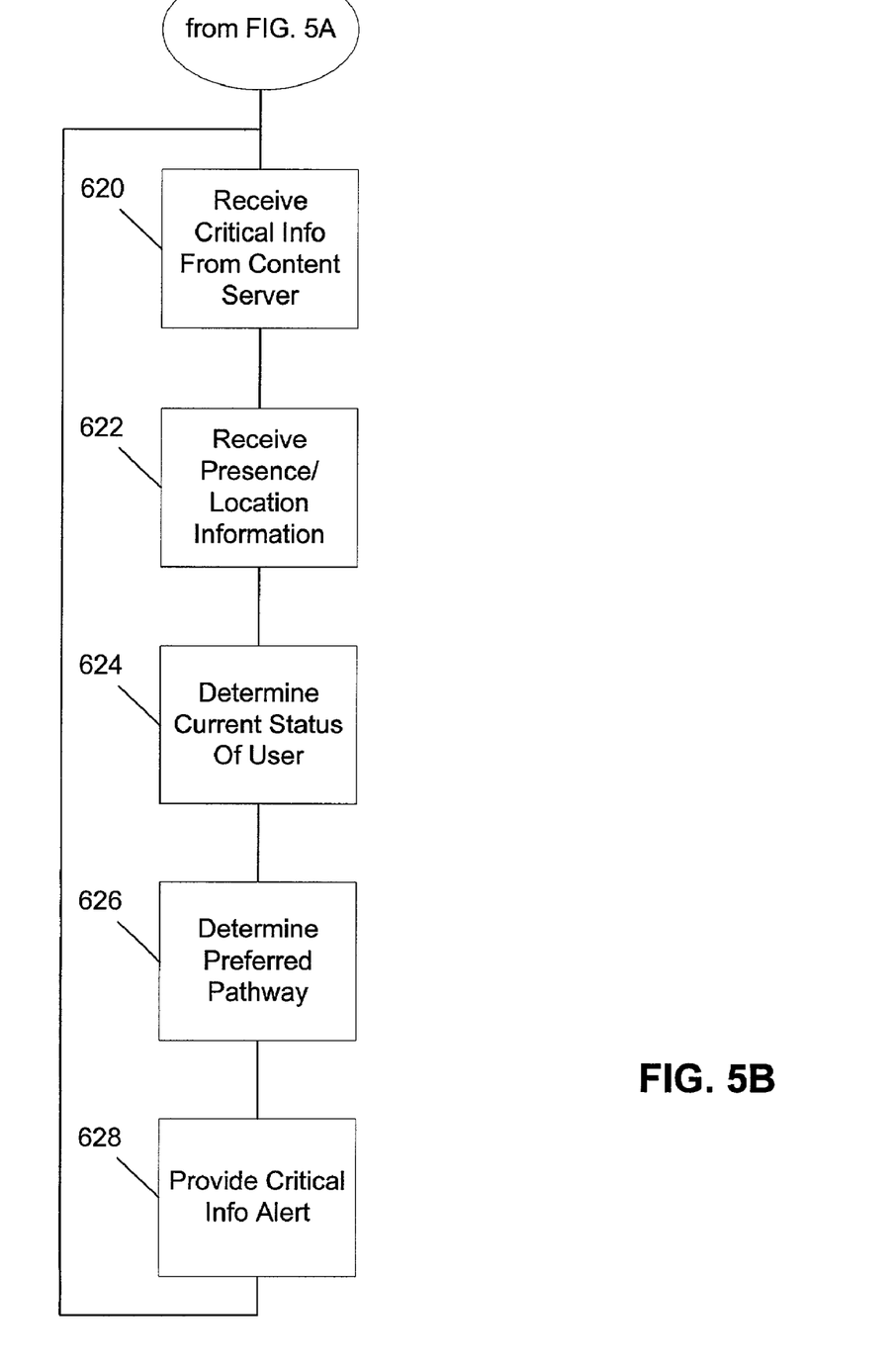

FIGS. 5A and 5B provide a flowchart of a method 600 according to the invention for providing critical information alerts. At step 602, the user accesses the alerting service to provide data necessary to set up the user profile in the data store. As described in detail above, the user can access the alerting service via telephone (e.g., by dialing a telephone number associated with the service), or via the Internet (e.g., by using a browser on the user's computer to connect to a web site that the notification service provides).

In a preferred embodiment of the invention, the alerting service is implemented as a subscription service. That is, only paid subscribers can utilize the service. It should be understood, however, that the service could also be implemented such that a subscription is unnecessary. If the service is implemented as a subscription service, then, at step 604, the service determines whether the user is a subscriber to the service. Otherwise, the service skips to step 614.

Preferably, the alert server includes a data store that contains a respective account ID and a user signature for each subscriber. A user signature can include, for example, a user ID/password combination associated with the respective subscriber. The account ID can be, for example, a unique alphanumeric identifier that the service assigns to the respective subscriber's account. At step 604, the service invites the user to input a user signature, and determines whether the user is a subscriber by determining whether the input signature is in the data store. Preferably, the service also provides a mechanism by which the user can change his/her signature (e.g., by changing his/her password), and by which the user can provide a friendly name associated with him/herself.

If, at step 604, the alert server determines that the user is not a subscriber (e.g., if the input user signature is not in the data store), then, at step 606, the service provides a user interface via which the user can subscribe to the service. For example, if the service is implemented as a telephone based service, the service can invite the user to subscribe by providing an audio message such as "If you wish to subscribe to this service, please press or say '1.'" The service can then prompt the user to set up an account (e.g., input a signature, friendly name, and preferred payment information) using the telephone keypad or transceiver. Similarly, if the service is implemented as a web-based service, the service can invite the user to subscribe by providing a window (or a link to a subscription web page) that enables the user to set up an account.

At step 608, the service determines whether the user has elected to subscribe. If, at step 608, the service determines that the user has not elected to subscribe (e.g., the user cancels the transaction or does not input the requested data within a certain timeout period), then, at step 610, the service terminates access (by disconnecting the telephone call or providing an error message on the web page, for example).

If the service determines that the user is a subscriber, or if the service is not implemented as a subscription service, then the service begins to request from the user certain data that will enable the service to provide critical information alerts to the user. (If the service is not implemented as a subscription service, then the service can invite a first-time user to set up an account by entering a user signature and friendly name.)

At step 614, the service invites the user to input status criteria associated with the user. For example, the service can provide a user interface via which the user can input one or more sets of status criteria that enable the alert server to determine a preferred communication pathway by which to notify the user of any critical information. As described above in connection with FIG. 4, the status criteria can be based on time of day, day of the week, etc. The status criteria can also be based on current presence information or location data associated with the user. The service receives the status criteria from the user, and stores the status criteria in the data store in the user profile associated with the user.

At step 616, the service invites the user to input a respective communications pathway associated with each set of status criteria. For example, during the workday (e.g., Monday through Friday from 9:00 am until 5:00 pm), the user might wish to be notified of any critical information via his office email account. Accordingly, the user can specify his email address. Similarly, during drive time (e.g., Monday through Friday from 8:30 am until 9:00 am), the user might wish to be notified of any critical information via his mobile telephone. Accordingly, the user can provide his mobile telephone number.

Optionally, the service can enable the user to input an indication as to whether the critical information alert should include a text or audio message. For example, the user might want the alert to include an audio message if it is directed to a telephone, but might prefer a text message if it is directed to his PDA, or an audio file attachment to an email message. Alternatively, the alert server can be programmed to recognize that a critical information alert directed to a pager number or email address should include a text message, for example, and that a critical information alert directed to a telephone number should include an audio message as a default. The service can optionally provide the user with the capability to override the default notification message type.

After the user account is set up, at step 620, the alert server begins to receive critical information from the content server(s) associated with the user. It should be understood that the alert server can receive critical information from any number of content servers and provide critical information alerts to any number of users. Accordingly, the alert server determines from the received critical information message the identity of the user to which the critical information is to be delivered. This data can be, as described above, contained in a network address that the user specifies to the content server in order to have the critical information delivered to the alert server in the first place.

At step 622, the alert server receives from the presence server and location server, respectively, presence information and location data associated with the user to which the critical information alert is to be delivered. Preferably, the alert server "pulls" the presence information and location data from the presence and location servers. That is, the alert server requests that the presence and information servers provide presence information and location data associated with a specified user on demand. In this way, the alert server does not have to maintain current information about each user, and can request it at the time it receives critical information from the content server. Alternatively, however, the system can be designed such that the presence server and location server "push" the presence information and location data to the alert server. In such an embodiment, the server can maintain the presence information and location data for each user in the alert server's data store.

At step 624, the alert server determines the user's current status and, at step 626, the alert server determines, based on the user's current status, the preferred pathway via which to deliver the critical information alert. The alert server can determine the status of the user simply from the user profile. For example, if the alert server receives critical information for "Bill" at 3:00 p.m. on a Tuesday, the alert server can determine from Bill's user profile that a critical information alert should be delivered to Bill's office email account.

The alert server, however, can also use any received presence information or location data to determine the user's current status. For example, the presence information or location data might indicate that Bill is not in his office, even though it is Tuesday at 3:00 p.m. In that scenario, the alert server might determine that the preferred communication pathway is via Bill's mobile phone. However, the presence information might also indicate that Bill's mobile phone is turned off, but that his pager is turned on. In that scenario, the alert server might determine that the preferred communication pathway is via Bill's pager. In any event, at step 624, the alert server determines the user's current status from the user profile and any available presence information and location data. At step 626, the alert server determines the preferred pathway based on the user's current status. It should be understood that the alert server can be set up such that a user can specify more than one "preferred" pathway for a given user status. For example, the user might wish to have critical information alerts delivered during the workday via his pager and his office email.

At step 628, the alert server provides the critical information alert to the user via the preferred communication pathway(s). For example, if the preferred communication pathway is the user's mobile telephone, the service can automatically place a telephone call to the user's mobile telephone number, and provide an audio message such as "Bill, ABS stock hit $50.00 per share." If the communications pathway is an email address, pager number, fax number, or text-phone number, for example, the service can dispatch an email notification that includes a similar text message. The server then returns to step 620 and continues monitoring for incoming critical information.

Thus, there have been described systems and methods for providing critical information based on profile data. Those skilled in the art will appreciate that numerous changes can be made to the preferred embodiments of the invention, and that such changes can be made without departing from the spirit of the invention. It is intended, therefore, that the appended claims cover all such equivalent variations as fall within the true spirit and scope of the invention.

What is claimed is:

1. A computer implemented method for providing critical information to a user of a content providing service, the method comprising:
    storing a user profile in a computer data storage device that identifies a plurality of communication pathways to at least one of a wireless and a wire line communication network via which a critical information alert can be provided to a user associated with the user profile,
        wherein the user profile includes a respective set of decision criteria associated with each of the plurality of communication pathways,
        wherein each set of decision criteria is based on a likely location of the user determined by a comparison of location data identifying a current geographic location of the user and current user presence information against location data identifying an associated location of the user stored in the user profile,
        wherein a specific communication pathway for the critical information alert and a message type of the critical information alert are automatically determined by the satisfaction of the decision criteria associated with one of the plurality of communication pathways;
    within the user profile, presenting the user with an option of choosing a specific message type to be included with the critical information alert, the choice being between one of a text message and an audio message regardless of the specific communication pathway determined for the critical information alert, wherein the user is also provided with the capability to override the specific message type;
    identifying a satisfied set of decision criteria from among the respective sets of decision criteria by determining information that is related to the decision criteria; and
    providing the critical information alert and the specific message from an alert server to the user via the communication pathway associated with the satisfied set of decision criteria, wherein the critical information alert contains critical information provided by the content providing service.

2. The method of claim 1, wherein at least one of the respective sets of decision criteria includes a decision criterion that is based on a current status of the user.

3. The method of claim 1, wherein at least one of the respective sets of decision criteria includes a decision criterion that is based on a current day of the week.

4. The method of claim 1, wherein at least one of the respective sets of decision criteria includes a decision criterion that is based on a current location of the user determined by a transmitted signal train.

5. The method of claim 1, wherein storing the user profile comprises:
storing a user profile that identifies, for a selected communication pathway selected from the plurality of communication pathways, an alert receiving device associated with the selected communication pathway.

6. The method of claim 5, wherein storing the user profile comprises:
storing a user profile that identifies, for the alert receiving device associated with the selected communication pathway, a device identifier that enables an alert server to provide the critical information alert via the selected communication pathway.

7. The method of claim 6, wherein storing the user profile comprises:
storing a user profile that identifies a device identifier that includes a number that enables the alert server to establish a telephone connection to the alert receiving device.

8. The method of claim 7, wherein storing the user profile comprises:
storing a user profile that identifies a device identifier that includes at least one of a telephone number, a pager number, and a fax number.

9. The method of claim 6, wherein storing the user profile comprises:
storing a user profile that identifies a device identifier that includes a network address that enables the alert server to establish a telephone connection to the alert receiving device.

10. The method of claim 9, wherein storing the user profile comprises:
storing a user profile that identifies a device identifier that includes an email address.

11. The method of claim 1, further comprising:
providing a user interface via which the user can provide data relating to the user profile.

12. The method of claim 1, wherein providing the critical information alert comprises:
providing the critical information alert to an alert receiving device associated with the communication pathway associated with the satisfied set of decision criteria.

13. An alert server, comprising:
a computer data storage device that contains a user profile associated with a user of a content provider service, wherein the user profile includes a respective set of decision criteria associated with each of a plurality of communication pathways, wherein the decision criteria is based on a likely location of the user determined by a comparison of location data identifying a current geographic location of the user and current user presence information against location data identifying an associated location of the user stored in the user profile;
identification means for identifying, from the plurality of communication pathways and based on the user profile, a preferred communication pathway for transmitting a critical information alert by determining first information that is distinct from use of the communication pathways and by determining second information that is not related to failed attempts to transmit the critical information alert over one or more of the communication pathways, wherein a message type of the of the critical information alert is automatically determined by the satisfaction of set of decision criteria associated with one of the plurality of communication pathways;
selection means for allowing the user an option to select a specific message type by which the critical information alert is to be transmitted, the specific message type option including one of a text message and an audio message regardless of the message type determined for the critical information alert;
override means for allowing the user the option to override the specific message type; and
transmission means for transmitting the critical information alert via the preferred communication pathway.

14. The alert server of claim 13, further comprising:
receiving means for receiving presence information associated with the user, wherein the identification means identifies the preferred communication pathway based on the presence information.

15. The alert server of claim 13, wherein the first information comprises the time of day and the day of the week and wherein the user profile specifies a first communication pathway in association with a range of days of the week and a range of the time of the day and the user profile specifies at least a second communication pathway in association with the days of the week and the times of day not associated with the first communication pathway.

16. The alert server of claim 13, wherein the critical information alert contains the critical information.

17. The alert server of claim 13, wherein the user profile identifies the plurality of communication pathways via which the critical information alert can be provided.

18. The alert server of claim 13, further comprising:
receiving means for receiving presence information associated with the user, wherein the identification means identifies the preferred communication pathway based on the presence information, wherein the second information comprises the presence information which indicates the communication pathways to which the user is currently present.

19. The alert server of claim 13, further comprising:
receiving means for receiving location information associated with the user, wherein the identification means identifies the preferred communication pathway based on the location information, wherein the first information comprises the location information that is obtained through a location system independent of the communication pathways.

20. The method of claim 1, wherein at least one of the respective sets of decision criteria includes a decision criterion that is based on a current location of the user and wherein the information that is related to the decision criteria and that is distinct from use of the communication pathways indicates the current location of the user.

21. The method of claim 1, wherein at least one of the respective sets of decision criteria includes a decision criterion that is based on presence information associated with the user and wherein the presence information indicates which communication pathways are currently in use by the user.

* * * * *